United States Patent
Naccache et al.

(10) Patent No.: US 8,732,505 B2
(45) Date of Patent: May 20, 2014

(54) METHOD FOR REDUCING THE ENERGY CONSUMPTION OF AN ELECTRONIC TERMINAL BY MODIFYING TIMEOUT-BEFORE-STANDBY DURATION, CORRESPONDING TERMINAL AND COMPUTER PROGRAM

(75) Inventors: David Naccache, Paris (FR); Eric Brier, Valence (FR); Patrice Le Marre, Upie (FR); Jean-Louis Sarradin, Etables (FR); Jean-Sébastien Coron, Rueil Malmaison (FR); Jean-Marie Aubanel, Saint-Péray (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 577 days.

(21) Appl. No.: 13/037,519

(22) Filed: Mar. 1, 2011

(65) Prior Publication Data
US 2011/0214000 A1    Sep. 1, 2011

(30) Foreign Application Priority Data
Mar. 1, 2010  (FR) ...................................... 10 51465

(51) Int. Cl.
*G06F 1/00*    (2006.01)
*G06F 1/32*    (2006.01)
*G06F 11/34*   (2006.01)

(52) U.S. Cl.
CPC .. *G06F 1/32* (2013.01); *G06F 11/34* (2013.01)
USPC ........................................................ 713/330

(58) Field of Classification Search
CPC .................................. G06F 1/32; G06F 11/34
USPC .......................................................... 713/300
See application file for complete search history.

(56) References Cited

U.S. PATENT DOCUMENTS

| | | | |
|---|---|---|---|
| 5,794,137 A * | 8/1998 | Harte | 455/343.4 |
| 5,913,067 A | 6/1999 | Klein | |
| 7,398,405 B2 * | 7/2008 | Aoki et al. | 713/320 |
| 8,117,467 B2 * | 2/2012 | Chang et al. | 713/300 |
| 2007/0288777 A1 | 12/2007 | Schutte | |
| 2009/0031182 A1 * | 1/2009 | Okada | 714/746 |
| 2009/0300390 A1 | 12/2009 | Vojak et al. | |

FOREIGN PATENT DOCUMENTS

| EP | 1617315 A1 | 1/2006 |
|---|---|---|
| EP | 2105822 A1 | 9/2009 |

OTHER PUBLICATIONS

French Search Report dated Oct. 14, 2010 for corresponding French Application No. 1051465, filed Mar. 1, 2010.

\* cited by examiner

*Primary Examiner* — Mohammed Rehman
(74) *Attorney, Agent, or Firm* — David D. Brush; Westman, Champlin & Koehler, P.A.

(57) ABSTRACT

A method and apparatus are provided for reducing the energy consumption of an electronic terminal. The method implements a step of modifying the timeout-before-standby duration for said terminal after an action performed by and/or on said terminal at a current instant, depending on the membership of the current instant in a given temporal category, from among at least two predefined temporal categories.

12 Claims, 3 Drawing Sheets

|  | Standby mode | Working mode |
|---|---|---|
| Action to be performed | $\Delta P = 1+\alpha$ | $\Delta P = 1$ |
| No action to be performed | $\Delta P = 0$ | $\Delta P = \gamma.\Delta T$ |

METHOD FOR REDUCING THE ENERGY CONSUMPTION OF AN ELECTRONIC TERMINAL BY MODIFYING TIMEOUT-BEFORE-STANDBY DURATION, CORRESPONDING TERMINAL AND COMPUTER PROGRAM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of electronic terminals.

More specifically, the disclosure pertains to a technique for reducing the energy consumption of an electronic terminal such as an electronic payment terminal.

BACKGROUND OF THE DISCLOSURE

Let us consider such an electronic terminal, for example in a store or a restaurant. Such an electronic payment terminal performs several transactions per day.

There is a known technique for reducing energy consumption in which such an electronic payment terminal goes into standby.

One drawback of this prior-art technique lies in the time taken by the terminal to get reactivated and be ready for a transaction. This waiting time may penalize a user wishing to carry out a transaction when the terminal is in standby mode.

There is therefore a need for a technique to optimize the reduction of the energy consumption of an electronic terminal without penalizing potential users of the terminal.

SUMMARY

An exemplary aspect of the disclosure relates to a method for reducing the energy consumption of an electronic terminal.

In an illustrative embodiment, the method includes modifying the duration of the timeout for putting the terminal on standby (or "timeout-before-standby" duration) after an action performed by and/or on the terminal at a current instant, depending on the membership of the current instant in a given temporal category, from among at least two predefined temporal categories.

Thus, an embodiment of the method the relies on a novel and inventive approach to the reduction of energy consumed by an electronic terminal by modifying the timeout-before-standby duration of the terminal after an action performed by the terminal or on the terminal.

Indeed, to save energy, in a classic way, a terminal goes into standby automatically at the end of a timeout that gets activated after each action performed by/on the terminal. This timeout may have a fixed duration specific to the terminal or a fixed duration that is programmable according to criteria related to the use of the terminal.

An illustrative embodiment of the disclosure relies on a modification of the duration of the timeout as a function of the current instant or more specifically the membership of the current instant in a given temporal category, from among at least two predefined temporal categories.

Thus, the duration of the timeout may be variable in the course of the day, depending for example on the frequency of use of the terminal.

For example, the temporal categories are defined by at least one parameter belonging to the group comprising:
 a time slot in a day or a week;
 at least one day in a week or a month.

For example, a temporal category corresponds to a time slot, for example a one-hour slot, or a slot of several hours, in a day or in a week.

Thus, the timeout-before-standby duration for the terminal after an action can be modified every hour, depending for example on the use of the terminal.

The timeout duration may also depend on time slots covering several hours in a day, for example from 09 h00 to 12 h00, and then 12 h00 to 14 h00 and from 14 h00 to 18 h00.

In another example, the duration of the timeout may depend on the day of the week, for example whether it is a weekday or a Saturday.

In particular, modifying the timeout duration additionally takes account of a parameter representing an estimated tolerance of a set of users of the terminal to a time lag in execution of an action by and/or on the terminal.

Thus, an illustrative embodiment also makes it possible to take account of not only the current instant but also a factor related to the users of the terminal and more particularly to an estimated tolerance of a time lag in the execution of an action of the terminal.

Indeed, when a terminal is in standby mode when a user needs it for an action, this action can be executed by the terminal only after a certain time lag related to the time taken by the terminal to leave standby mode. This time lag may be tolerated by the users in varying degrees, and their degree of acceptance of this time or their sensitivity to this time is taken into account by the method to modify the duration of the timeout.

Thus, if for example the users are considered to be fairly tolerant of the time taken by the terminal to leave the standby mode, then the terminal can be put into standby mode more routinely without fearing any negative reaction from users who need the terminal while it is in standby mode.

On the contrary, if the users are considered for example to be very sensitive to the time taken by the terminal to leave standby mode, then the terminal will not be placed routinely in standby mode so as not to create situations in which a user needs the terminal while it is in standby mode.

In one particular aspect of the disclosure, the method for reducing the energy consumption of an electronic terminal comprises a preliminary phase for computing statistics on the number of actions performed by and/or on the terminal during a recurrent predetermined period, delivering a function x(t) variable as a function of time and representing an estimated number of actions during the predetermined period.

Thus, in this embodiment, the method applies statistics on the frequency of use of the terminal according to time, for example according to the hours of the day, making it possible to model the use of the terminal by a function representing the number of actions performed by/on the terminal according to time.

This function then makes it possible to determine hours or time slots during which the terminal is much used and other hours or time slots during which, on the contrary, the terminal is not much used so that the method can take account of these hours or time slots to modify the timeout-before-standby duration.

In particular, the method for reducing the energy consumption of an electronic terminal implements the following steps:
- comparing, at a predetermined instant t, the value of the function x(t) with at least one predetermined threshold denoted as $x_0$;
- determining a timeout duration as a function of the result of the comparison.

Thus, the method takes account of a predetermined threshold to modify the timeout-before-standby duration. Thus when the number of actions is below the threshold, then the timeout-before-standby duration can be relatively short whereas, on the contrary, when the number of actions is above a threshold, then it is preferable for the timeout-before-standby duration to be relatively long.

According to one particular characteristic, the method for reducing the energy consumption of an electronic terminal assigns two distinct durations to the timeout, depending on whether x(t) is smaller than or equal to the predetermined threshold $x_0$, or whether x(t) is above the predetermined threshold $x_0$.

For example, the predetermined threshold $x_0$ is a function of an energy value γ representing the energy consumed by the terminal during the predetermined period and/or a penalty value α representing an estimated tolerance of a set of users of the terminal to a time lag for the execution of an action by the terminal.

Thus, the threshold may be used to determine the timeout-before-standby duration takes two parameters into consideration, taking account of both the energy consumed by the terminal and the sensitivity of the users to a time lag in the execution of an action due to the time taken by the terminal to leave standby mode.

For example, the predetermined threshold $x_0$ is equal to $$\frac{\gamma}{\alpha}.$$

According to one particular aspect of the disclosure, the terminal is an electronic payment terminal and the actions are transactions.

In another embodiment, the disclosure pertains to an electronic terminal.

This terminal comprises means for modifying the timeout-before-standby duration for the terminal after an action performed by and/or on the terminal at a current instant depending on the membership of the current instant in a given temporal category from among at least two predefined temporal categories.

In particular, the means for modifying the timeout duration also take account of a parameter representing an estimated tolerance of a set of users of the terminal to a time lag of execution of an action by the terminal.

For example, the terminal is an electronic payment terminal and the energy consuming actions are transactions.

Such an electronic terminal is especially adapted to implementing the above-described method for reducing energy consumption. It is for example a payment terminal. In other embodiments, it may also be a radio telephone or laptop or personal digital assistant (PDA) type of terminal.

Another aspect of the disclosure also pertains to a computer program product downloadable from a communications network and/or recorded on a non-transitory computer-readable carrier (such as a hardware memory) and/or executable by a processor, comprising program code instructions to implement the method for reducing the consumption of energy by an electronic terminal as described here above.

BRIEF DESCRIPTION OF THE DRAWINGS

Other features and advantages shall appear more clearly from the following description of a particular embodiment given by way of a simple, illustrative and non-restrictive example and from the appended drawings, of which.

DETAILED DESCRIPTION OF ILLUSTRATIVE EMBODIMENTS

1. General Principle

Figures 1, 2:
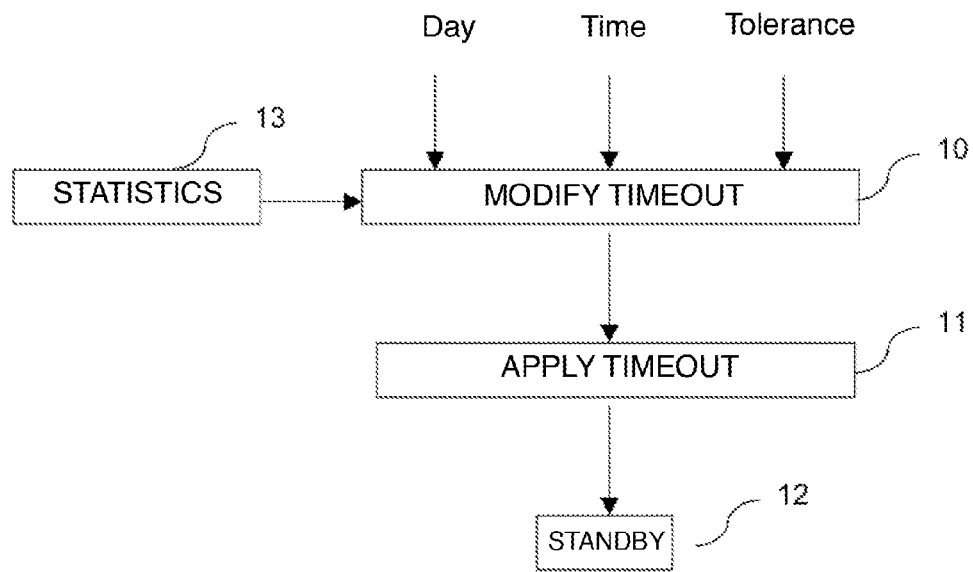
FIG. 1 shows the main steps of a method for reducing the energy consumption of an electronic terminal according to one embodiment of the disclosure.
FIG. 2 illustrates four cases of variation ΔP of the function P of total penalty during a short period of time denoted as ΔT.
Figure 3:
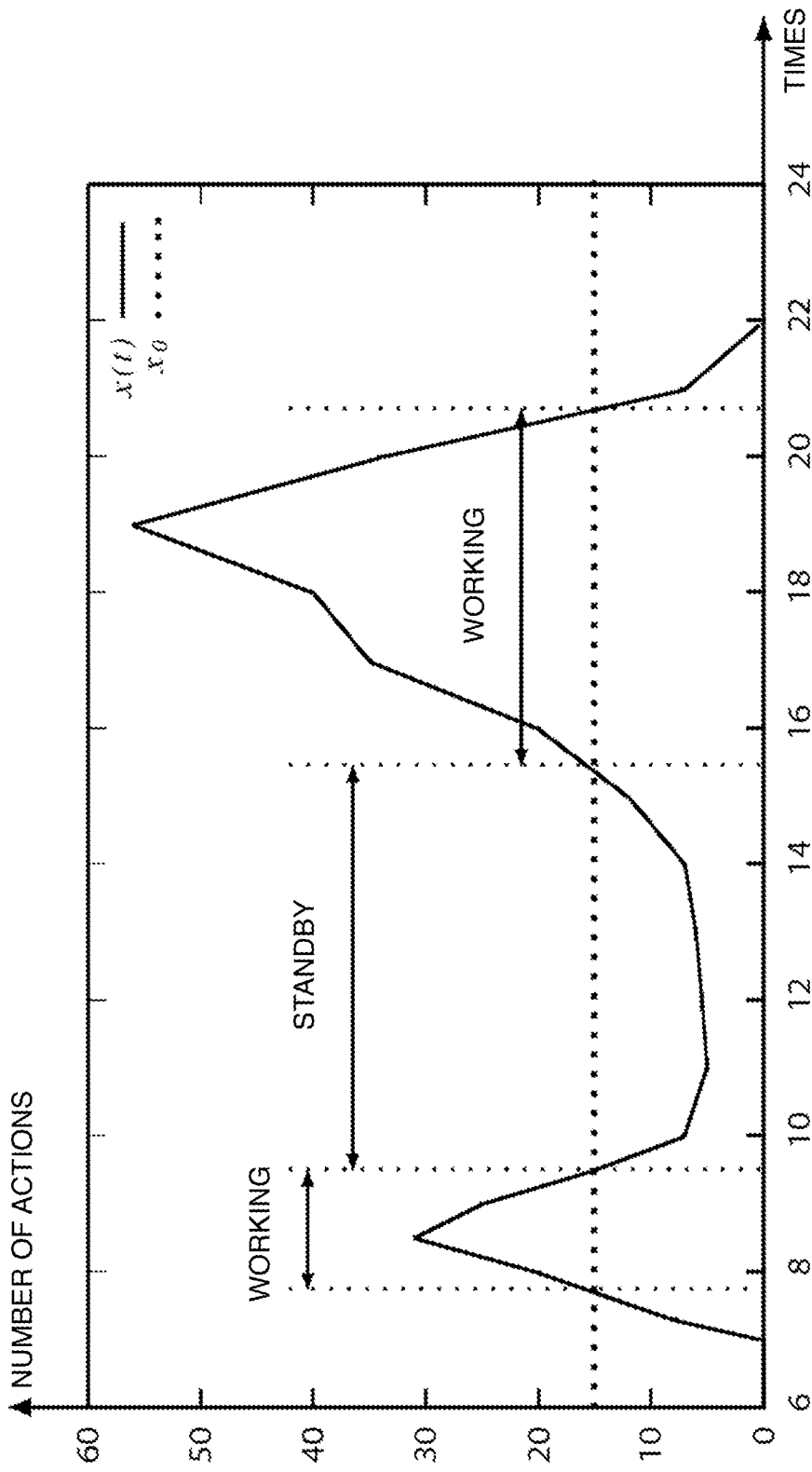
FIG. 3 illustrates an example of a function of distribution of the actions of a terminal during a day.

The general principle of an illustrative embodiment of the disclosure is based on the fact that an electronic terminal in standby mode consumes no energy and that, consequently, the reduction of the consumption of energy of an electronic terminal is related to the duration for which this terminal is in standby mode.

The general principle of an embodiment is also based on the fact that when an action is required by a user when the terminal is in standby mode, then the time taken to leave the standby mode can entail penalties for the user since the action is delayed.

An aspect of the disclosure is therefore is based on observing the frequency of the energy-consuming actions performed by/or on an electronic terminal so as to determine the appropriate moments for putting the device into standby mode, and on considering an estimated tolerance of the users to a time lag for the execution of an action. This is equivalent to determining the moments when the fact that the terminal is in standby mode does not penalize the users.

Besides, the appropriate moments for putting the device on standby are defined by a timeout-before-standby duration for the terminal after an action so as not to put a terminal on standby while it is performing an action.

An aspect of the disclosure is therefore based on a modification of the timeout-before-standby duration as a function of the frequency of the actions performed by the terminal and an estimated tolerance, on the part of a set of users, to a time lag for the execution of an action.

2. Modeling

Initially, an operational model of a terminal has been defined, assuming the following:

x(t) the number of energy-consuming actions performed by/on a terminal during a predetermined period, for example during one hour, in a day of use (for example an electronic payment terminal in a store, during the store opening times). This function x(t) can be obtained by taking statistics during a preliminary phase of observation of the use of the terminal, for example over several days of use;

γ is the value of energy representing the energy consumed by said terminal during a predetermined period, for example during one hour. The terminal in standby mode is considered to be consuming no energy and the value of γ for an action is taken to be equal to 1;

α is the penalty value representing an estimated tolerance of a set of users of said terminal to a time lag of execution of an action by said terminal. It is taken that if the terminal is not in standby mode, no penalty is induced inasmuch as the action can be done immediately by the terminal. Thus α is a measurement of the estimated sensitivity of a set of users to a delay in the execution of an action due to the time taken by the terminal to leave the standby mode. A high value of α indicates that the estimated tolerance of a set of users is low and that the user's waiting time must be reduced to the minimum.

From this model, it is therefore assumed that a daily sequence of actions follows a distribution of actions given by x(t).

E denotes the total energy consumed by a terminal in one day and N the number of penalties induced in one day.

We define a function P of total penalty, taking account both of the energy consumed and of the penalties induced for a day, which can be written as follows:

$$P = E + N.\alpha \tag{1}$$

It must be noted that if α=0, i.e. if no penalty is considered, then the function P depends only on the energy consumption. Thus, to reduce the total penalty, it is enough to reduce the energy consumption and therefore the best strategy is to place the terminal in standby mode after each action performed.

On the contrary, if we take a high value of α, i.e. if the users are considered to be highly sensitive or to have low tolerance to a time lag in waiting for the execution of an action, then the total energy E becomes negligible in the equation (1) as compared with the value of the penalty given by N.α. In this case, to reduce the total penalty, it is enough to reduce the penalty and therefore the best strategy is to leave the terminal in working mode all the time and never to place it in standby mode.

However, for the "average" values of estimated sensitivity of the users, defining the optimal strategy for reducing the total penalty given by the function P is equivalent to defining the appropriate time for placing the terminal on standby independently of an action, because the terminal leaves the standby mode routinely upon a request for an action, and given the parameters x(t), γ and α.

3. Optimal Strategy

We assume initially a variation denoted ΔP of the function P of total penalty over a short period denoted as ΔT.

In accordance with the above-defined model, this variation ΔP comprises the energy consumed by the terminal over a duration ΔT and a possible penalty if an action is required while the terminal is in standby mode.

We can distinguish four different cases of variation during this short duration ΔT illustrated in the table of FIG. 2.

In a first case, it is taken that the terminal is in standby mode and that no action is required. In this case, the terminal consumes no energy and there is no penalty to be taken into account, so that we obtain: ΔP=0.

In a second case, it is taken that the terminal is in working mode (not on standby) and that no action is required. By definition, the energy consumed by the terminal during ΔT is equal to γ.ΔT and the variation ΔP is written as: ΔP=γ.ΔT.

In a third case, it is taken that the terminal is in standby mode and that action is required. As defined in the above model, the energy consumption γ of the terminal during this action is equal to 1. Furthermore, a penalty is induced because the action takes place during the standby mode of the terminal. The variation ΔP can then be written as: ΔP=1+α.

Finally, in the fourth and last case, it is taken that the terminal is in working mode and that an action is required. No penalty is induced and the energy consumption γ of the terminal during this action is equal to 1, as already indicated here above. The variation ΔP is then: ΔP=1.

From these four situations, it is possible to compute an average of the variation ΔP during ΔT.

To this end, we consider p the probability that an action is required during ΔT, given by: p=x(t).ΔT, with x(t) being the number of actions per hour.

Thus, when a terminal is in standby mode, we have a probability p that the variation ΔP is equal 1+α, and a probability 1−p that the variation ΔP is zero.

The average variation $\Delta P_{sb}$ of the total penalty function in standby mode is written as follows:

$$\Delta P_{sb} = p.(1+\alpha) + (1-p).0 = (1+\alpha).x(t).\Delta T \tag{2}$$

In the same way, when a terminal is in operation (working mode), the average variation $\Delta P_w$ of the total penalty function in working mode can be written as follows:

$$\Delta P_w = p.1 + (1-p).\gamma.\Delta T = x(t).\Delta T + (1-x(t).\Delta T)\gamma.\Delta T$$

If $\Delta T^2$ is considered to be negligible, we obtain:

$$\Delta P_w = (x(t)+\gamma).\Delta T \tag{3}$$

From the equations (2) and (3), and seeking to have an average variation of the total penalty function in standby mode that is lower than or equal to the average variation in working mode, we obtain:

$$\Delta P_{sb} \leq \Delta P_w \Leftrightarrow (1+\alpha).x(t) \leq x(t)+\gamma,$$

and therefore:

$$\Delta P_{sb} \leq \Delta P_w \Leftrightarrow \alpha.x(t) \leq \gamma \tag{4}$$

The equation (4) therefore indicates that when the parameters x(t), γ and α are such that α.x(t)≤γ, then the average variation of the total penalty function in standby mode is effectively smaller than or equal to the average variation in working mode. This means that a reduction of the total penalty function can be obtained by putting the terminal into standby mode. In practice, this optimal strategy corresponds to a period of low frequency of the actions required.

On the contrary, when the parameters x(t), γ and α are such that α.x(t)>γ, then the variation of the total penalty function in standby mode is greater than the average variation in working mode. This means that it is more advantageous to leave the terminal in working mode rather than to put it into standby mode, even when there is no request for action. In practice, this optimal strategy corresponds to a period of high frequency of the actions required.

Thus, if we define an action frequency threshold denoted as $x_0$, such that:

$$x_0 = \frac{\gamma}{\alpha},$$

an optimal strategy for reducing the energy consumption of a terminal is to make the terminal pass into standby mode when the function $x(t)$ is smaller than or equal to the threshold $x_0$ and to leave the terminal in working mode when the function $x(t)$ is above the threshold $x_0$.

Thus, an optimal strategy for reducing the energy consumption of a terminal is to choose a relatively short timeout-before-standby duration when the function $x(t)$ is below or equal to the threshold $x_0$ and to chose, on the contrary, a relatively lengthy timeout-before-standby duration when the function $x(t)$ is above the threshold $x_0$.

It must be noted that this optimal strategy does not depend on the value E of the energy consumed by a terminal for an action whether or not we take E=1. Indeed, whether the terminal is in standby mode or not, the energy consumption for an action is the same.

Finally, this strategy proves to be optimal if it is sought to minimize the variation of the total penalty function at each instant t.

4. Description of One Embodiment

Referring now to FIG. 1, we present the main steps of the method for reducing the energy consumption of an electronic terminal, based on the optimal strategy described here above, using the model which has also been described here above.

In particular, the electronic terminal is considered here to be an electronic payment terminal and the required actions are considered to be transactions.

As already described here above, a preliminary phase of statistics 13 is implemented during a recurrent predetermined period, for example a period of several days in a week, for a function $x(t)$ variable according to time and representing an estimated number of transactions performed by the terminal during the predetermined period.

Then, the application of the method includes first of all of a first step 10 for modifying the duration of the timeout, taking account of the following items of data:
 temporal data items such as the day and the current time;
 a piece of data representing the estimated tolerance of a set of users of the terminal to a time lag of execution of a transaction by the terminal;
 statistics obtained preliminarily during the phase 13.

The estimated tolerance of a set of users can also be obtained by statistics on the behavior of the users, through observation of these users over a recurrent predetermined period or by polling these users on their sensitivity to a time lag in waiting to perform a transaction. This estimated tolerance can be variable as a function of the current instant (for example time slots at midday or at the end of the day or all through Saturday, when the users' tolerance is lower than during other time slots).

Then, a threshold $x_0$ is computed from the piece of data on tolerance and on statistics.

Finally, the temporal data items are used to determine the temporal category of the current instant and thus to know if the curve $x(t)$ is above or below the threshold $x_0$ at the current instant. Depending on this comparison, a timeout duration is chosen.

These steps may be implemented in the terminal itself or in an external device, distinct from the terminal, communicating with the terminal.

During a following step 11 for applying the chosen timeout duration, the modified timeout duration is taken into account by the terminal.

For example, the application of the chosen timeout duration is directly implemented by the terminal when it is the terminal that has implemented the previous steps.

In another configuration, when it is an external device, distinct from the terminal that has implemented the previous steps, a command for applying the chosen timeout duration is transmitted to the terminal by the device in question.

According to one variant, this command may be for a direct change of the value of the timeout parameter internal to the terminal when the device has direct access to the working parameter of the terminal.

According to another variant, this command may activate a series of actions in the terminal to modify the value of the timeout parameter internal to the terminal.

According to one embodiment of the disclosure, it may be that this application step 11 is implemented only when the duration of the timeout is different from the duration parameterized in the terminal.

Thus, if it is the terminal that has implemented the step 10 for modifying the timeout, it does not update the timeout duration when the timeout duration chosen at the step 10 is identical to the duration currently used in the terminal.

Should it be an external device that has implemented the step 10, it transmits no command for applying the chosen timeout duration to the terminal if this duration is the same as the one currently used in the terminal.

A step 12 for putting the terminal on standby takes place at the expiry of the timeout duration chosen and parameterized in the terminal during the previous steps 10 and 11.

According to one embodiment of the disclosure, a step for "enforcing" the timeout duration can be implemented so as to consider a particular situation that is distinct from the model determined by the statistics.

For example, if the shopkeeper or tradesman observes user behavior different from that estimated by the statistics (for example an unexpected peak during a time slot that is usually "quiet" or on the contrary a significant drop in customers during a time slot normally estimated to be very busy), then he can modify the duration of the timeout independently of the model previously described and the criteria taken into account at the steps 10 and 11 so as to further optimize the management of the energy consumption of the terminal.

Thus, an example of the method enables a flexible and optimal management of the energy consumption of an electronic terminal.

Figure 4:
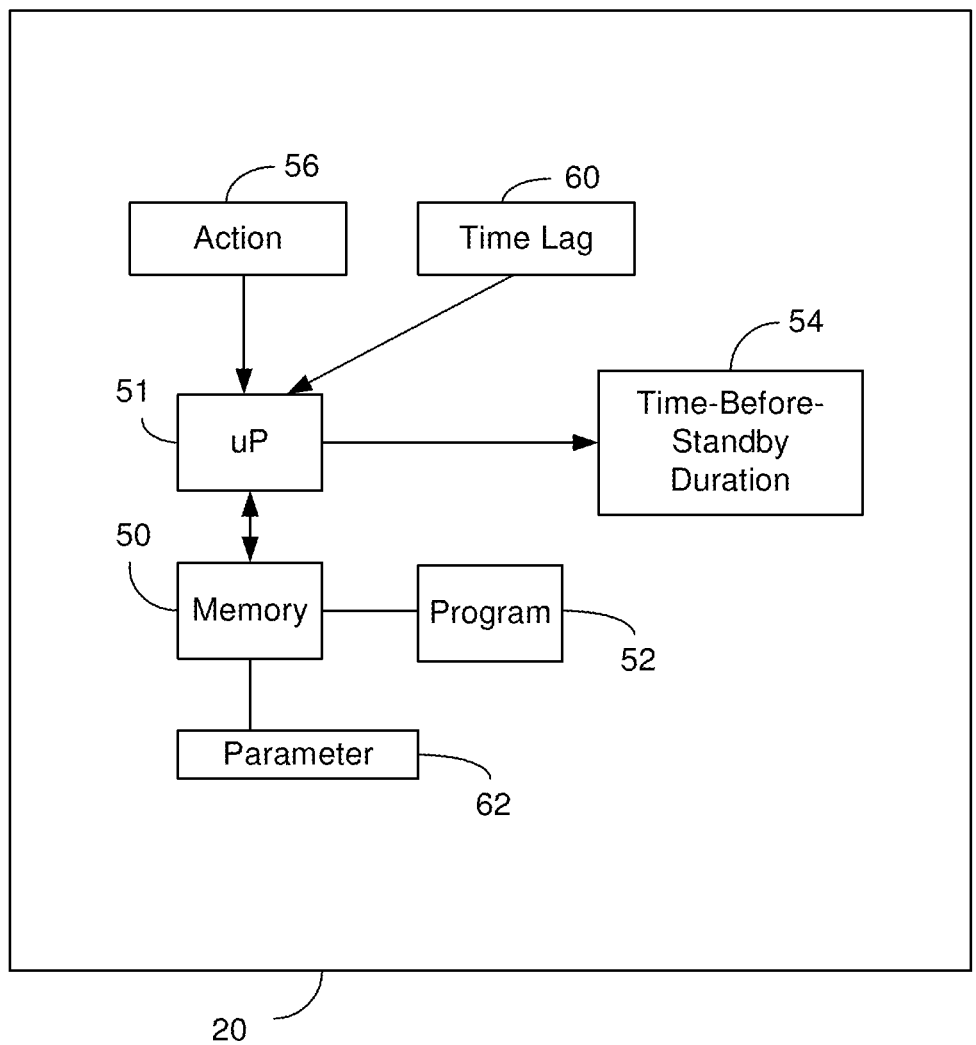
FIG. 4 is a block diagram of an electronic terminal, such as an electronic payment terminal, according to an exemplary embodiment of the disclosure.

FIG. 4 is a block diagram illustrating a simplified structure of an electronic device 20, such as an electronic payment terminal, according to one embodiment of the disclosure. The terminal 20 includes a non-transitory computer readable carrier, such as a hardware memory 50, which stores a program product 52 that is executable by a processor 51. When executed by processor 51, the program 52 performs the method for reducing the consumption of energy by the electronic terminal 20 as described herein.

For example, the program 52 modifies a timeout-before-standby duration 54 for the terminal 20 after an action 56 performed by and/or on the terminal 20 at a current instant depending on membership of the current instant in a given temporal category, from among at least two predefined temporal categories, taking account of a parameter 62 in memory 50 representing an estimated tolerance of a set of users of the terminal 20 to a time lag 60 in execution of the action 56 by and/or on the terminal Although the present disclosure has been described with reference to one or more examples, workers skilled in the art will recognize that changes may be made in form and detail without departing from the scope of the disclosure and/or the appended claims.

What is claimed is:

1. A method for reducing energy consumption of an electronic terminal, wherein said method comprises:

modifying a timeout-before-standby duration for said terminal after an action performed by or on said terminal at a current instant depending on membership of the current instant in a given temporal category, from among at least two predefined temporal categories, taking account of a parameter representing an estimated tolerance of a set of users of said terminal to a time lag in execution of an action by or on said terminal;

a preliminary phase of computing statistics on a number of actions performed by and/or on said terminal during a recurrent predetermined period, delivering a function x(t) variable as a function of time and representing an estimated number of actions during said predetermined period;

comparing, at a predetermined instant t, the value of the function x(t) with at least one predetermined threshold denoted as $x_0$: and wherein said predetermined threshold $x_0$ is a function of a penalty value α representing the estimated tolerance of the set of users of the terminal to a time lag for execution of an action by or on said terminal.

2. The method for reducing the energy consumption of an electronic terminal according to claim 1, wherein said temporal categories are defined by at least one parameter belonging to the group consisting of:
a time slot in a day or a week; and
at least one day in a week or a month.

3. The method for reducing the energy consumption of an electronic terminal according to claim 1, wherein the method comprises the following steps:
determining a timeout duration as a function of the result of said step of comparing.

4. The method for reducing the energy consumption of an electronic terminal according to claim 3, wherein said method assigns two distinct durations to the timeout, depending on whether x(t) is smaller than or equal to the predetermined threshold $x_0$, or whether x(t) is above the predetermined threshold $x_0$.

5. The method for reducing the energy consumption of an electronic terminal according to claim 1, wherein said predetermined threshold x0 is also a function of an energy value γ representing the energy consumed by the terminal during said predetermined period.

6. The method for reducing the energy consumption of an electronic terminal according to claim 1, wherein said predetermined threshold $x_0$ is equal to $$\frac{\gamma}{\alpha}.$$

7. The method for reducing the energy consumption of an electronic terminal according to claim 1, wherein said terminal is an electronic payment terminal and said actions are transactions.

8. An electronic terminal, which comprises:
a timeout-before-standby duration;
means for modifying the timeout-before-standby duration after an action performed by or on said terminal at a current instant, depending on membership of the current instant in a given temporal category, from among at least two predefined temporal categories, taking account of a parameter representing an estimated tolerance of a set of users of said terminal to a time lag of execution of an action by said terminal;

means for computing statistics, a preliminary phase, on a number of actions performed by and/or on said terminal during a recurrent predetermined period, delivering a function x(t) variable as a function of time and representing an estimated number of actions during said predetermined period; and means for comparing, at a predetermined instant t, the value of the function x(t) with at least one predetermined threshold denoted as $x_0$, wherein said predetermined threshold $x_0$ is a function of a penalty value cc representing the estimated tolerance of the set of users of the terminal to a time lag for execution of an action by or on said terminal.

9. The electronic terminal according to claim 8, wherein said terminal is an electronic payment terminal and said energy-consuming actions are transactions.

10. The electronic terminal of claim 8, wherein the predetermined threshold $x_0$ is a function of an energy value γ representing the energy consumed by the terminal during said predetermined period.

11. A non-transitory computer-readable carrier comprising a computer program product recorded thereon and executable by a processor, wherein the product comprises program code instructions to implement a method for reducing the consumption of energy by an electronic terminal when the instructions are executed by the processor, wherein the method comprises:
modifying a timeout-before-standby duration for said terminal after an action performed by or on said terminal at a current instant depending on membership of the current instant in a given temporal category, from among at least two predefined temporal categories, taking account of a parameter representing an estimated tolerance of a set of users of said terminal to a time lag in execution of an action by or on said terminal;

a preliminary phase of computing statistics on a number of actions performed by and/or on said terminal during a recurrent predetermined period, delivering a function x(t) variable as a function of time and representing an estimated number of actions during said predetermined period; and comparing, at a predetermined instant t, the value of the function x(t) with at least one predetermined threshold denoted as $x_0$; wherein said predetermined threshold $x_0$ is a function of a penalty value γ representing the estimated tolerance of the set of users of the terminal to a time lag for execution of an action by or on said terminal.

12. The non-transitory computer-readable carrier of claim 11, wherein the predetermined threshold $x_0$ is a function of an energy value γ representing the energy consumed by the terminal during said predetermined period.

* * * * *